United States Patent [19]
Ferrante

[11] Patent Number: 5,497,803
[45] Date of Patent: Mar. 12, 1996

[54] PRESSURE REGULATOR FOR THE FIRST STAGE OF TWO-STAGE AQUALUNGS

[75] Inventor: Michele Ferrante, Serra Riccó, Italy

[73] Assignee: A.B. Vitaldado S.p.A., Italy

[21] Appl. No.: 354,073

[22] Filed: Dec. 6, 1994

[30] Foreign Application Priority Data

Dec. 17, 1993 [IT] Italy .................. GE93A0109

[51] Int. Cl.⁶ .......................... F16K 51/00; G05D 16/06
[52] U.S. Cl. ............... 137/505.42; 137/908; 251/148
[58] Field of Search .............. 137/505.42, 908; 251/148

[56] References Cited

U.S. PATENT DOCUMENTS

| | | |
|---|---|---|
| 2,459,643 | 1/1949 | Hartley . |
| 2,747,607 | 5/1956 | Matasovic ............... 137/505.42 |
| 3,972,346 | 8/1976 | Wormser ................ 137/505.42 |
| 4,384,591 | 5/1983 | Tan . |
| 5,097,860 | 3/1992 | Ferguson et al. ........ 137/505.42 |
| 5,176,169 | 1/1993 | Ferguson .............. 137/505.42 |

FOREIGN PATENT DOCUMENTS

| | | |
|---|---|---|
| 0310738 | 4/1989 | European Pat. Off. . |
| 0319657 | 6/1989 | European Pat. Off. . |
| 0522913 | 1/1993 | European Pat. Off. . |
| 919622 | 9/1954 | Germany . |
| 2931676 | 2/1980 | Germany . |
| 800210 | 8/1958 | United Kingdom . |

Primary Examiner—Stephen M. Hepperle
Attorney, Agent, or Firm—Larson and Taylor

[57] ABSTRACT

Pressure regulator for the first stage of two-stage aqualungs, comprising a high-pressure gas inlet, a high-pressure chamber communicating with this inlet, an intermediate-pressure chamber and a reducing valve interposed between said high-pressure chamber and said intermediate-pressure chamber. Said intermediate-pressure chamber and optionally also said high-pressure chamber are provided with a plurality of outlets. The high-pressure chamber, the reducing valve and the intermediate-pressure chamber are assembled in a cylindrical body. The intermediate-pressure outlets and also, if present, the high-pressure outlets, are formed in annular bodies mounted leaktightly against the escape of compressed fluid in such a way that they can be turned freely about the axis of said cylindrical body and such that they communicate via suitable ports and/or manifolds with said chambers of the pressure regulator

9 Claims, 1 Drawing Sheet

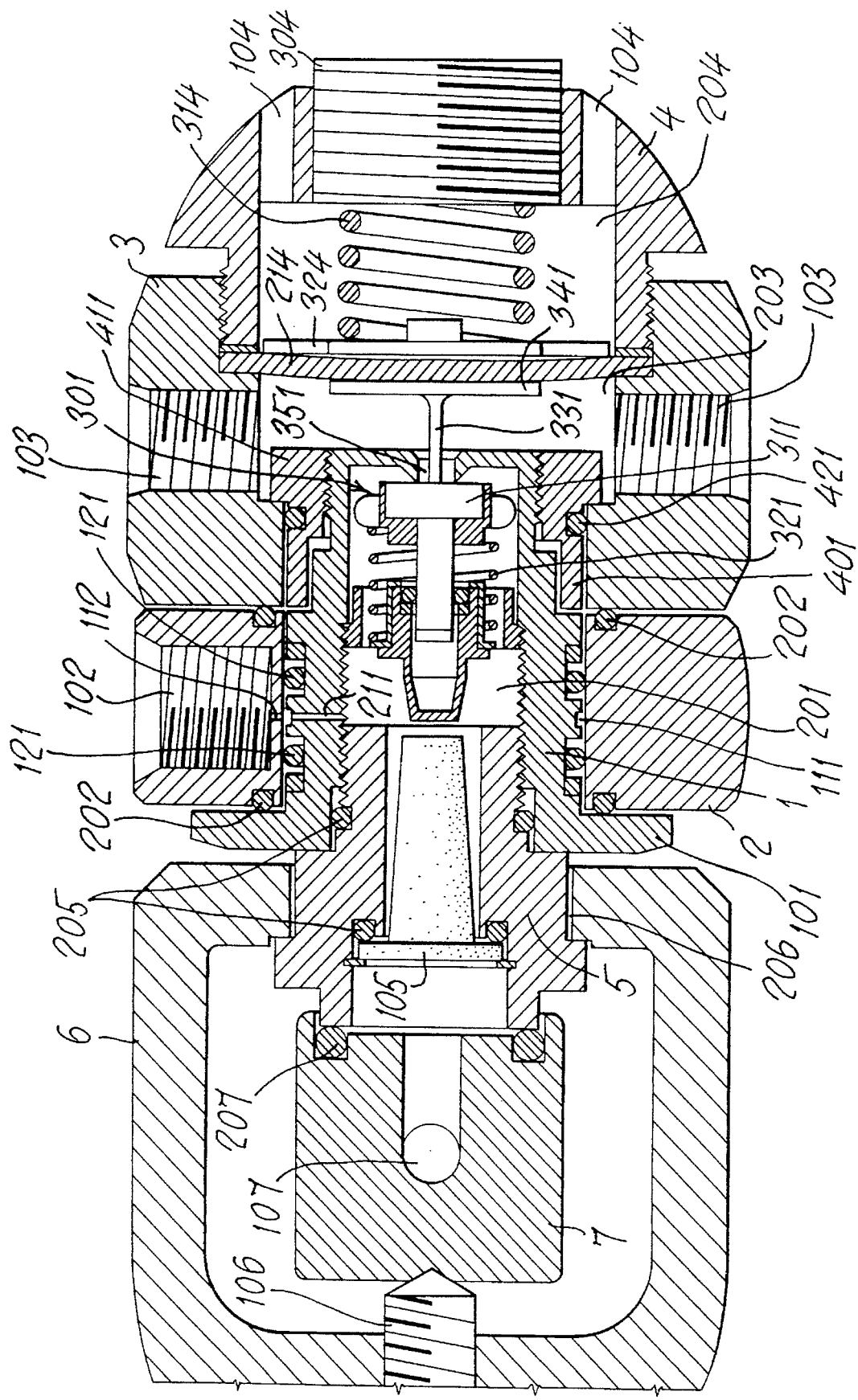

5,497,803

PRESSURE REGULATOR FOR THE FIRST STAGE OF TWO-STAGE AQUALUNGS

BACKGROUND AND SUMMARY OF THE INVENTION

The invention relates to a pressure regulator, especially a pressure regulator for the first reducing stage of a two-stage aqualung for diving.

Such a regulator of a type known per se comprises a high-pressure chamber connectable by suitable means to the outlet of a cylinder of compressed air (or to a manifold connecting the outlets of more than one cylinder) and communicating via a reducing valve with an intermediate-pressure chamber. The intermediate-pressure chamber, and very often also the high-pressure chamber, are provided with outlet connections to which pressure gauges or other accessories are fitted by means of flexible tubes.

In these known regulators it is sometimes exceedingly difficult, if not impossible, to adapt or position these tubes to suit the convenience and safety of the diver. It is self-evident that this kind of problem makes it very difficult to use the devices known hitherto, quite apart from the potential danger of the loops of the tubes snagging on underwater projections.

The object of the present invention is to overcome these problems by adopting a device that will enable the tubes to be positioned more easily, appropriately and safely and with no problems as regards the leaktightness of the connections between the tubes and the outlet ducts of the regulator.

The subject of the present invention is therefore a pressure regulator for the first stage of two-stage aqualungs, comprising a high-pressure gas inlet, a high-pressure chamber communicating with this inlet, and reducing valve interposed between said high-pressure chamber and an intermediate-pressure chamber, said intermediate-pressure chamber, and optionally also said high-pressure chamber, being provided with a plurality of outlets, the regulator being characterized in that the high-pressure chamber, reducing valve and intermediate-pressure chamber are assembled in a cylindrical body and in that the intermediate-pressure and, if present, high-pressure outlets are formed in annular bodies mounted in such a way that they can be turned freely about the axis of said cylindrical body of said pressure regulator.

Another feature of the invention is that said annular body containing the intermediate-pressure outlets of the regulator, itself constitutes the side walls of the intermediate-pressure chamber, being closed at its top by a leaktight screw plug, housing the compensating chamber of the regulator.

Advantageously, said cylindrical body of the regulator according to the invention has two flanges, one located at its end nearest the inlet entrance and the other located in the intermediate-pressure chamber, and these flanges constitute the parts that lock and assemble the two annular bodies on the cylindrical body of the regulator.

In this way the diver can position the various tubes to best suit him, even when the regulator is at pressure, without any problem developing; for the manufacturer too, there is the advantage of having a high-pressure chamber already completely assembled on which to mount, according to demand, said annular bodies, even if of different shapes, that can be angled in different positions.

BRIEF DESCRIPTION OF THE DRAWINGS

Other advantages and features will become clear in the following description of one embodiment of the present invention, provided for illustrative purposes with no limitation being implied, with reference to the enclosed single drawing sheet, in which:

FIG. 1 is a view in longitudinal section of the regulator according to the present invention.

DESCRIPTION OF THE PREFERRED EMBODIMENT OF THE INVENTION

In FIG. 1, the numeral 1 denotes the central cylindrical body of the regulator according to the present invention. Contained within this cylindrical body 1 are the high-pressure chamber 201 and the reducing valve 301. The high-pressure chamber 201 communicates upstream with the entrance 5 which is screwed to the threaded end of the body 1 and is provided with a filter 105 and O-ring sealing means 205. Connected upstream of said entrance 5 is the dispensing nozzle 7, provided with a dispensing duct 107, from a dispensing valve of a cylinder containing air or a mixture of breathable gases. Said nozzle 7 is connected to the entrance 5 by screwing home the screw 106 of the yoke 6, which has a through hole 206 in which the entrance 5 sits. Formed about the body 1, around the high-pressure chamber 201, is an annular chamber 111 communicating with the high-pressure chamber 201 through a duct 112. The part of the body 1 nearest the entrance 5 terminates in a flange 101 whose function will be described below. Located downstream of the high-pressure chamber 201 is the reducing valve 301 comprising the shutoff means 311, the prestressed spring 321, the rod 331, the plate 341 connected to the latter and the duct 351. The end of the body 1 comprising the valve 301 is threaded and there is screwed onto it a ring nut 401, with a flange 411, whose purpose will be described later and with sealing components 421. Mounted around the cylindrical body 1 are two annular bodies 2 and 3; these annular bodies are provided with outlet ducts 102 and 103 respectively and can be rotated about the cylindrical body 1 in a leaktight manner because of the sealing components 202, 121, 421 respectively. The annular body 2 is situated between the flange 101 of the cylindrical body 1 and the upstream end of the ring nut 401; the duct 102 of the annular body 2 communicates with the annular manifold 111 through the hole 211 in its end wall. The annular body 3 is adjacent to the annular body 2, and its side walls, in the present illustrated embodiment, are the side walls of the intermediate-pressure chamber 203 delimited upstream by the top of the cylindrical body 1 and downstream by the flexible wall 214; the ducts 103 communicate directly with the intermediate-pressure chamber 203. The annular body 3 is closed downstream by a screw plug 4 which houses the compensating chamber 204, communicating with the exterior through the holes 104 on the wall of said plug. Inside said chamber are a plate 324 on which presses a spring 314 stressed by a bush 304.

The operation of the regulator, known in the prior art, and a detailed explanation of which falls outside the purposes of the present invention, can thus be briefly illustrated. The high-pressure air escaping through the dispensing nozzle 7 of the cylinder, enters the entrance 5, and from here, after passing through the filter 105, reaches the high-pressure chamber 201 in the cylindrical body 1. From here it passes to the reducing valve 301 which communicates, through the duct 351, with the chamber 203. This chamber communicates in turn, through the ducts 103, with the second stage; each time a breath is taken, the depression created in the chamber 203 is compensated for by a new admission of air through the valve 301, brought about by the opening of the valve shutoff means 311 which is pushed back by the rod 331 connected to the plate 341 which detects the inward flexing of the diaphragm 214. In this way the gas reaches the chamber 203 where it expands and is then dispensed through the outlets 103 at a lower pressure. The diaphragm 214 is prestressed by the pressure exerted on the plate 324 by a spring 314, whose tension is controlled by adjusting the bush 304. The chamber 204 above the diaphragm 214 also has another function of adjustment, namely to compensate for variations in external pressure communicated through the holes 104 in the walls of the plug 4 in which this chamber is formed.

In prior-art regulators there is still the problem, as mentioned at the outset, of positioning the tubes so that they can be easily arranged by the diver. The problem is solved here as follows. The annular body 3, containing the intermediate-pressure outlets 103, can be rotated about the ring nut 401 screwed onto the end of the cylindrical body 1 comprising the dispensing valve 301. In the same way the body 2, comprising the outlet 102 connected through the hole 112 to the annular manifold 111 running around the cylindrical body 1 and communicating with the high-pressure chamber 201 through the duct 211, can be rotated about the cylindrical body 1 in a sealed manner. The flange 101 of the cylindrical body 1 and the flange 411 of the ring nut 401 enable the two rotating annular bodies 2, 3 to be assembled on the cylindrical body 1 in such a way that said annular bodies can be turned independently and allow the tubes, which can be connected to the respective outlets 102, 103, to be positioned in the most comfortable position for the diver.

I claim:

1. A pressure regulator for the first stage of two-stage aqualungs, comprising:
   a cylindrical body;
   a high-pressure gas inlet positioned upstream from said cylindrical body;
   a compensating chamber positioned downstream from said cylindrical body;
   a first annular body surrounding said cylindrical body and having a plurality of intermediate pressure outlets formed therein, said first annular body being leaktight against the escape of compressed fluid and freely rotatable about the axis of said cylindrical body; and
   a high-pressure chamber, an intermediate-pressure chamber and a reducing valve positioned inside said cylindrical body, said reducing valve being interposed between said high-pressure and intermediate pressure chambers and controlled through said compensating chamber, said high-pressure chamber communicating with said high pressure gas inlet, side walls of said intermediate-pressure chamber being formed by said first annular body, said plurality of intermediate pressure outlets being in communication via suitable ports with said intermediate-pressure chamber.

2. A pressure regulator according to claim 1 further comprising a screw plug for housing said compensating chamber and sealing said first annular body at its top.

3. A pressure regulator according to claim 1, further comprising a second annular body adjacent said first annular body, wherein said cylindrical body includes two flanges, one of said flanges being located at its end nearest the high pressure gas inlet and the other of said flanges being located in the intermediate-pressure chamber, for locking and assembling the two annular bodies.

4. A pressure regulator according to claim 1 wherein said cylindrical body includes, in a region of the high-pressure chamber, an annular manifold communicating with said high pressure chamber and said first annular body.

5. A pressure regulator for the first stage of two-stage aqualungs, comprising:
   a cylindrical body;
   a high-pressure gas inlet positioned upstream from said cylindrical body;
   a compensating chamber positioned downstream from said cylindrical body;
   a first annular body surrounding said cylindrical body and having a plurality of intermediate pressure outlets formed therein, a second annular body surrounding said cylindrical body and having a plurality of high pressure outlets formed therein, said first and second annular bodies being leaktight against the escape of compressed fluid and freely rotatable about the axis of said cylindrical body; and
   a high-pressure chamber, an intermediate-pressure chamber and a reducing valve positioned inside said cylindrical body, said reducing valve being interposed between said high-pressure and intermediate pressure chambers and controlled through said compensating chamber, said high-pressure chamber communicating with said high pressure gas inlet, said plurality of intermediate pressure outlets being in communication via suitable ports with said intermediate-pressure chamber, said plurality of high pressure outlets being in communication via suitable ports with said high-pressure chamber.

6. A pressure regulator according to claim 5 wherein side walls of the intermediate-pressure chamber are formed by said first annular body.

7. A pressure regulator according to claim 5 further comprising a screw plug for housing said compensating chamber and sealing said first annular body at its top.

8. A pressure regulator according to claim 5 wherein said cylindrical body of the regulator includes two flanges, one of said flanges being located at its end nearest the high pressure gas inlet and the other of said flanges being located in the intermediate-pressure chamber for locking and assembling said first and second annular bodies.

9. A pressure regulator according to claim 5 wherein, in a region of said high-pressure chamber, said cylindrical body includes an annular manifold communicating with said high-pressure chamber and with said second annular body, and in a region of said intermediate-pressure chamber, said cylindrical body includes an annular manifold communicating with said intermediate-pressure chamber and with said first annular body.

* * * * *